United States Patent
Rothmund et al.

(10) Patent No.: US 9,133,791 B2
(45) Date of Patent: Sep. 15, 2015

(54) CARRIER HOUSING AND INTERNAL COMBUSTION ENGINE

(75) Inventors: Walter Rothmund, Salem (DE); Peter Cubon, Lindau (DE); Christopher Allnoch, Tettnang (DE); Christian Brunner, Friedrichshafen (DE); Steffen Harscher, Langenargen (DE); Roland Buchmann, Beggenhausetal (DE)

(73) Assignee: MTU Friedrichshafen GmbH (DE)

( * ) Notice: Subject to any disclaimer, the term of this patent is extended or adjusted under 35 U.S.C. 154(b) by 352 days.

(21) Appl. No.: 13/825,292
(22) PCT Filed: Sep. 12, 2011
(86) PCT No.: PCT/EP2011/004579
§ 371 (c)(1),
(2), (4) Date: Jun. 4, 2013
(87) PCT Pub. No.: WO2012/038037
PCT Pub. Date: Mar. 29, 2012

(65) Prior Publication Data
US 2013/0263833 A1   Oct. 10, 2013

(30) Foreign Application Priority Data
Sep. 20, 2010 (DE) .......................... 10 2010 041 066

(51) Int. Cl.
*F02F 7/00* (2006.01)
*F02B 75/22* (2006.01)
(Continued)

(52) U.S. Cl.
CPC ............ *F02M 25/07* (2013.01); *F02B 29/0412* (2013.01); *F02B 29/0475* (2013.01);
(Continued)

(58) Field of Classification Search
CPC .............. F02M 25/07; F02M 25/0735; F02M 25/0711; F02M 35/116; F02B 37/007; F02B 37/013; F02B 39/14; F02B 29/0475; F02B 75/22
USPC ... 123/195 R, 195 A, 195 C, 196 R, 41.82 R, 123/559.1, 184.21, 568.12, 54.4
See application file for complete search history.

(56) References Cited

U.S. PATENT DOCUMENTS

| 5,003,934 A | 4/1991 | Gubon et al. |
| 5,697,217 A | 12/1997 | Ramsden et al. |

(Continued)

FOREIGN PATENT DOCUMENTS

| DE | 2156704 A1 | 5/1972 |
| DE | 2441354 A1 | 3/1976 |

(Continued)

OTHER PUBLICATIONS

PCT International Search Report dated Nov. 11, 2011 for PCT/EP2011/004579.

*Primary Examiner* — Hai Huynh
(74) *Attorney, Agent, or Firm* — Fishman Stewart Yamaguchi PLLC

(57) ABSTRACT

The disclosure relates to a carrier housing for an internal combustion engine having an engine block with a V arrangement of cylinders and having a charging group, designed for two-stage charging. The carrier housing is designed to bear at least a number of components of the charging group, and is designed to be arranged on an upper face of the engine block in an intermediate space of the V arrangement. The carrier housing includes a bottom fastening mechanism for attaching the carrier housing to the upper face of the engine block, a charge air channel formed in the interior of the carrier housing for conducting the charge air of a high-pressure and/or low-pressure stage of the charging group, a cooling fluid channel formed in an interior of the carrier housing for conducting the cooling fluid of an exhaust gas recirculation of the charging group, a channel for coolant and a channel for lubricant formed in the interior of the carrier housing for the high-pressure and/or low-pressure stage of the charging group, and upper carrying elements for components of at least the high-pressure and/or low-pressure stage of the charging group.

15 Claims, 3 Drawing Sheets

(51) Int. Cl.

| | | |
|---|---|---|
| *F02M 25/07* | (2006.01) | |
| *F02B 29/04* | (2006.01) | |
| *F02B 37/007* | (2006.01) | |
| *F02B 37/013* | (2006.01) | |
| *F02B 39/00* | (2006.01) | |
| *F02B 39/14* | (2006.01) | |
| *F02B 67/10* | (2006.01) | |
| *F02M 35/116* | (2006.01) | |

(52) U.S. Cl.
CPC ............ *F02B37/007* (2013.01); *F02B 37/013* (2013.01); *F02B 39/005* (2013.01); *F02B 39/14* (2013.01); *F02B 67/10* (2013.01); *F02B 75/22* (2013.01); *F02M 25/0711* (2013.01); *F02M 25/0735* (2013.01); *F02M 25/0737* (2013.01); *F02M 35/116* (2013.01); *Y02T 10/121* (2013.01); *Y02T 10/144* (2013.01); *Y02T 10/146* (2013.01)

(56) References Cited

U.S. PATENT DOCUMENTS

| | | |
|---|---|---|
| 8,245,511 B2 | 8/2012 | Cowland et al. |
| 2009/0320472 A1 | 12/2009 | Cowland et al. |

FOREIGN PATENT DOCUMENTS

| | | |
|---|---|---|
| DE | 4218146 C1 | 5/1993 |
| DE | 4432073 A1 | 3/1996 |
| DE | 19736500 A1 | 12/1998 |
| DE | 19858918 A1 | 7/1999 |
| DE | 101 22 406 A1 | 11/2002 |
| EP | 1 873 366 A1 | 1/2008 |
| GB | 1331957 A | 9/1973 |
| GB | 2292976 A | 3/1996 | ably understood that there is an increased capacity with this type of design.

CARRIER HOUSING AND INTERNAL COMBUSTION ENGINE

CROSS REFERENCE TO RELATED APPLICATIONS

This application is a National Phase Application related to PCT/EP2011/0004579 filed on Sep. 12, 2011, which application claims priority to DE 10 2010 041 066.7 filed on Sep. 20, 2010, which applications are incorporated herein by reference in their entirety.

TECHNICAL FIELD

The present disclosure relates to a carrier housing for an internal combustion engine having a motor unit, a V-type arrangement of cylinders and a charging group, which is designed for a two-stage charging and comprises a low-pressure stage and a high-pressure stage and an exhaust gas recirculation, wherein the carrier housing is designed to support at least a number of components of the charging group. Moreover, the present disclosure relates to an internal combustion engine having a motor unit, a V-type arrangement of cylinders and a charging group as well as a carrier housing.

BACKGROUND

A turbocharger is used to increase the performance of internal combustion engines of the type mentioned above, here in particular as provided within the scope of a two-stage charging as well as exhaust gas recirculation. A charging group is typically attached on a top side of a crankcase of an internal combustion engine; in so doing, both space-related conditions of a vehicle or ship shall be considered as well as specifications of the internal combustion engine which affect the supply of charge air and the removal of exhaust gas of the internal combustion engine. The mounted status of the charging group may, for example take into account that one front side of it is allocated to a power-driven side of the internal combustion engine and one back side of it is allocated to an opposing power-driven side of the internal combustion engine, wherein the exhaust gas exists on the opposing power-driven side of the internal combustion engine. For the manufacturer of the internal combustion engine, this means that the manufacturer is required to stockpile different carrier housings, manifolds and different lubricant and coolant lines for the charging group.

A carrier housing having a base for a turbocharger is disclosed in DE 44 32 073 A1. Both can be mounted on the internal combustion engine in two different mounting states. The problem associated with the proposed solution is the large variety of parts.

DE 101 22 406 A1, owned by the applicant of the present application, discloses a carrier housing having channels for coolants and lubricants arranged on an inside of the carrier housing, wherein the channel for a lubricant return is arranged in the carrier housing in an extension of a rotational axis. Because the charging group can be transformed from a first into a second mounting state around the rotational axis, this means a considerable reduction of parts including for different mounting states.

The advantageous realization of the reduction of parts with respect to an internal combustion engine having a V-type arrangement of cylinders is equally desirable for a two-stage charging having an exhaust gas conduct.

SUMMARY

A carrier housing and an internal combustion engine with a reduced space requirement due to a V-type arrangement of cylinders, is disclosed herein, thus allowing an improved reduction of parts.

More specifically, the disclosure is based, in part, on the concept that the carrier housing can be used in an improved fashion for conducting fluids of a charging group with respect to an interspace of the V-type arrangement of cylinders of an internal combustion engine. In so doing, the disclosure recognizes that the utilization of the interspace of the V-type arrangement offers a considerable potential for reduction of external fluid conducts. Fluid conducts of a charging group are typically mounted on the top side of the charging group. The design of the carrier housing according to an explanary arrangement of the disclosure allows the arrangement of a fluid conduct for the charging group in the interspace of the V-type arrangement, i.e., practically below the charging group and in a highly compact manner.

According to an exemplary arrangement, a carrier housing comprises a charge air channel, coolant channel and lubricant channel for at least a number of components of the charging group on an inside of said carrier casing. Corresponding external fluid conducts which are otherwise required are not necessary; instead, an exemplary arrangement provides that fluid conducts are guided in the interspace of the V-type arrangement by forming those conducts on the inside of the carrier housing. The interspace of the V-type arrangement refers to the cylindrical space at the top of a motor unit of the internal combustion engine extending generally parallel to the crank axis of the internal combustion engine, which expands from the narrow side at the bottom of a nearly triangular cross-section toward the top due to the V-type arrangement of the cylinders of the motor unit; i.e., the free space at the top of a motor unit between an A-side and B-side of a V-type arrangement of cylinders. The disclosure recognizes that the interspace can be utilized for the formation of fluid channels, thus resulting in a considerably increased packing density or degree of integration into the internal combustion engine while external fluid conducts are not required. Moreover, the disclosure recognizes that this is possible as long as a fluid conduct is designed in a sufficiently safe manner, which is achieved with the formation of the fluid conduct on the inside of the carrier casing.

Advantageous variations of the exemplary arrangement explained above within the scope of the conceptual formulation as well as with respect to other advantages.

Specifically, in one exemplary arrangement, a charge air channel is provided on the inside of the carrier housing for conducting the charge air of the high-pressure and/or low-pressure stage of the charging group. This additionally has the advantage that the charge air channel in the carrier casing can be equipped with an inlet designed as a diffusor, without the need of providing a separate external diffusor part. Analogously, this applies to at least one outlet, an in one exemplary arrangement, two outlets of the charge air channel. The carrier housing may comprise two connections to a high-pressure charge air cooler. In one exemplary configuration, both the connection to the high-pressure turbocharger as well as the at least one, optionally two, connections with the high-pressure charge air cooler are provided with a diffusor which is formed as an integral part of the carrier housing. In particular, it is possible to achieve an advantageous reduction of the flow speed and hence an improved efficiency by inclusion of two connections to the high-pressure charge air cooler. All in all, a lower flow speed can be set in the charge air channel, which leads to better efficiency of the charging group or the internal combustion engine. The charge air channel formed on the inside of the carrier housing may comprise one inlet and at least one outlet, and potentially two outlets, which are designed as diffusors and form an integral part of the inside of the carrier housing.

Furthermore, it is provided that a coolant channel is formed on the inside of the carrier housing. According to an exemplary arrangement of the invention, the coolant fluid is provided for conducting coolant of the exhaust gas recirculation of the charging group. As a result, an external coolant line for cooling the exhaust gas as intended within the scope of the exhaust gas recirculation can virtually be omitted. A coolant channel may be provided on the inside of the carrier housing for conducting the coolant of an exhaust gas recirculation cooler to a coolant outlet, to a coolant recirculation cooler. The coolant channel can advantageously be utilized for cooling the charge air channel provided on the inside of the carrier housing as well. The corresponding coolant channels may be formed in a counter-flow direction. This arrangement achieves an improved synergistic cooling effect for the charge air as well as an operationally reliable arrangement of the fluid channels on the inside of the carrier housing.

Moreover, it is provided according to an exemplary arrangement whereby a channel for coolants and a channel for lubricants are formed on the inside of the carrier housing, for example, an adequate number of said channels. The channels are provided for the high-pressure and/or low-pressure stage of the charging group.

A channel for coolants and a channel for lubricants for the high-pressure turbocharger of the high-pressure stage are preferably formed on the inside of the carrier housing. Coolant and lubricant channels for the high-pressure turbocharger of the high-pressure stage can advantageously be arranged in a particularly operationally reliable manner insider the carrier housing.

The carrier housing may also comprise a carrying arrangement for at least one intercooler for charge air and the carrying mechanism for the high-pressure charge air cooler for charge air. Advantageously, in particular the coolers of the charging group are mounted on the carrier housing in a low-vibration and operationally reliable manner.

The carrier housing may also comprise a carrying arrangement for the high-pressure turbocharger, which can be supported with the carrier housing in an equally operationally reliable manner as the channel for coolants and the channel for lubricants of the high-pressure turbocharger.

Within the scope of one exemplary arrangement of the carrier housing, the latter comprises a cradle part arranged between and connecting it with a console part on the front and a console part on the back. The console part on the front is preferably arranged on a power-driven side of the internal combustion engine if the carrier housing is mounted on the internal combustion engine. The console part on the back is preferably arranged on an opposing power-driven side of the internal combustion engine if the carrier housing is mounted on the internal combustion engine. With respect to the specifications of a vehicle, said arrangement is advantageous, albeit not required. An exemplary embodiment of a carrier housing which is in particular illustrated in the drawings is also suitable for an arrangement on an internal combustion engine turned by 180°, if this is necessary. For details, reference is made to the disclosure of co-owned DE 101 22 406 A1, which is deemed integrated in the content of the disclosure of the present application here through citation.

In one exemplary arrangement, the cradle part is formed with a base part at the bottom and a fluid conducting part at the top, wherein the base part comprises a fastening mechanism for mounting the carrier housing on the top side of the internal combustion engine. Based on one exemplary arrangement, it is intended to attach the fluid conducting channels in the carrier housing—for example, in the console part on the front and back and the fluid conducting part—as well as the components of the charging group on the carrier housing.

The fluid conducting part and the console part on the front may comprise a carrying arrangement at the top for carrying an intercooler. The console part at the back may comprise an almost turned over L-shaped cross-section or T-shaped cross-section. In particular, one side of the L-shaped cross-section or T-shaped cross-section forms a support area at the top for the high-pressure turbocharger. In particular, a mentioned side can additionally comprise a connecting strip for motor assemblies, in particular an air filter. In addition, other motor assemblies such as, e.g., air filters, exhaust gas sound absorbers, diesel particle filters, systems for catalytic reduction (in particular SCRs) or similar can generally be mounted on the carrier housing.

One exemplary arrangement equally relates to an internal combustion engine in which the two-stage charging with exhaust gas recirculation comprises a low-pressure stage having a first and second low-pressure turbocharger and a high-pressure stage having a high-pressure turbocharger. Each of the turbochargers comprises an exhaust gas turbine and a charge air compressor which can be driven by said exhaust gas turbine. The high-pressure turbocharger in particular comprises a high-pressure exhaust gas turbine and a high-pressure charge air compressor which can be driven by said high-pressure exhaust gas turbine. The low-pressure turbocharger in particular comprises a low-pressure exhaust gas turbine and a low-pressure charge air compressor which can be driven with said low-pressure exhaust gas turbine. In the present case, the low-pressure stage may be designed in duplicate. Consequently, in one exemplary arrangement, the charging group provides a triple charger arrangement of two low-pressure turbochargers and one high-pressure turbocharger.

In one exemplary arrangement, the carrier housing is designed as a single piece. The carrier housing is in particular mounted as a single carrier housing on the top side of the internal combustion engine in the interspace of the V-type arrangement using a fastening mechanism. According to disclosed arrangement, the number of components of the charging group comprises an intercooler for charge air, a high-pressure charge air cooler for charge air and a high-pressure turbocharger. Based on the disclosed arrangement, the latter are supported at the top side by the carrier housing and supplied with fluid (charge air, coolant and lubricant) at the underside.

Exemplary embodiments of the invention are described below based on the drawing. It is not provided to illustrate the exemplary embodiments necessarily true to scale; the drawing is in fact designed in schematic and/or slightly distorted form if this is conducive to the understanding. With respect to embodiments of the teaching directly derivable from the drawing, reference is made to the relevant prior art. It should be taken into account that a multitude of modifications and changes concerning the shape and the detail of an embodiment can be made without deviating from the scope of the invention. The characteristics of the embodiments of the invention disclosed in the description, the drawing as well as the claims can be relevant for alternatives of the invention both individually as well as in any combination. Furthermore, the scope of the invention covers any combination of at least two characteristics disclosed in the description, the drawing and/or the claims. The general idea of the invention is not restricted to the exact form or the detail of the preferred embodiment illustrated and described below or restricted to an object which would be deemed limited compared to the object included in the claims. With respect to the mentioned dimensioning ranges, values within the mentioned limits shall equally be deemed disclosed and arbitrarily utilizable and included in the claims.

BRIEF DESCRIPTION OF THE DRAWINGS

Other advantages, characteristics and details of the disclosure can be derived from the following description of exemplary embodiments as well as the drawings; in which.

DETAILED DESCRIPTION

Figure 1:
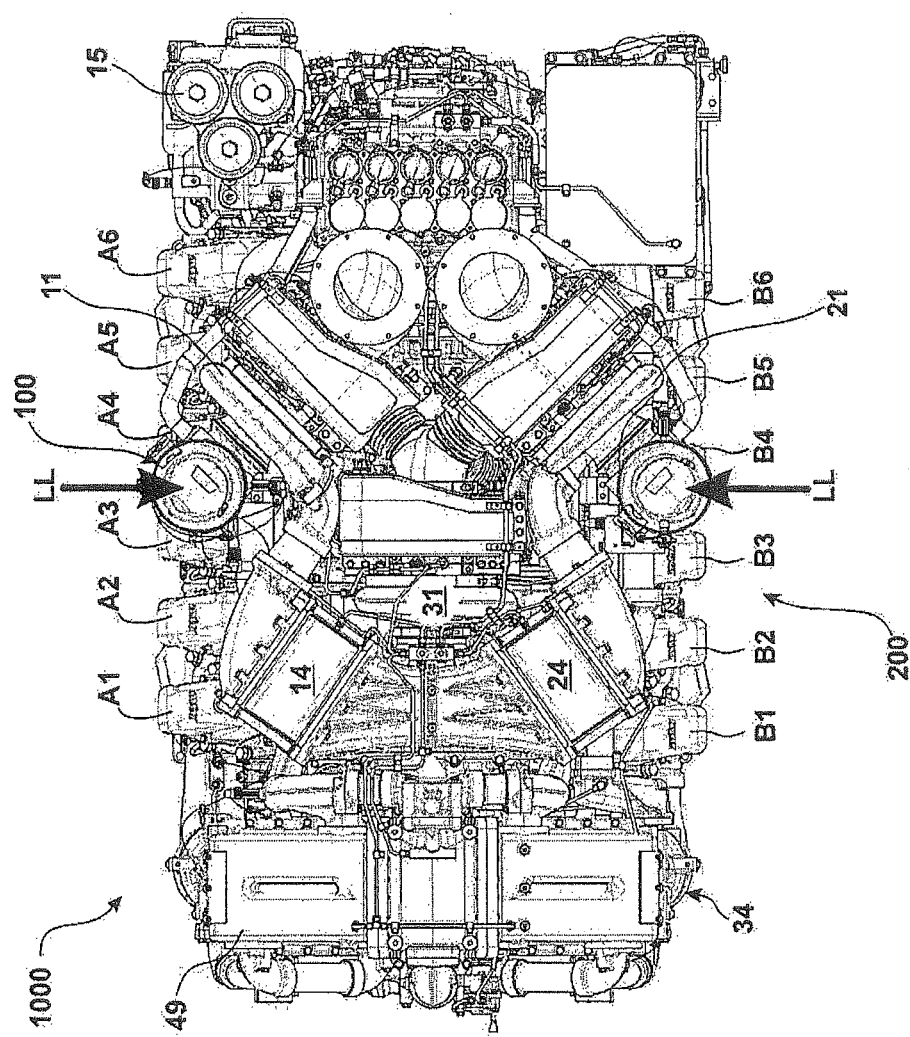
FIG. 1 shows a top view of a top side of an internal combustion engine having a motor unit and having a charging group in an exemplary, constructive embodiment.

For simplicity's sake, the same reference numbers are used below for identical or similar parts or for parts with identical or similar function.

Here, an exemplary embodiment of the invention is described based on an internal combustion engine having a two-stage charging with exhaust gas recirculation in a triple charger arrangement, i.e., having a first exhaust gas low-pressure turbocharger and a second exhaust gas low-pressure turbocharger and an exhaust gas high-pressure turbocharger as well as an exhaust gas recirculation equipped with an exhaust gas recirculation heat exchanger.

For this purpose, the internal combustion engine 1000 comprises a charging group 100 as well as an engine unit 200 having a V-type arrangement of cylinders A1-A6 and B1-B6. The charging group 100 comprises a first low-pressure stage, a second low-pressure stage, a high-pressure stage as well as an exhaust gas recirculation unit. The parts of the internal combustion engine 1000 described below are illustrated as an exemplary constructive embodiment in top view representation in FIG. 1. More specifically, the low-pressure stage comprises a first and second low-pressure turbocharger 11, 21 driven by exhaust gas AG for compressing charge air LL. The high-pressure stage comprises a high-pressure turbocharger 31 driven by exhaust gas AG for the further compression of charge air LL. Each of the turbochargers 11, 21, 31 is formed by means of an exhaust gas turbine which can be driven by exhaust gas AG and a charge air compressor which can be driven by the exhaust gas turbine, which are not described in more detail. Each of the low-pressure stages comprises a low-pressure charge air cooler 14 and 24, which is in each case arranged downstream of a charge air compressor in the supply direction of the charge air LL. The high-pressure stage comprises a high-pressure charge air cooler 34, which is arranged downstream of the high-pressure charge air compressor 33 in the supply direction of the charge air LL. The charge air LL is supplied via an air filter of a low-pressure stage and then supplied via a low-pressure charge air conduct from a low-pressure stage of the high-pressure stage. Next the charge air is conducted from the high-pressure charge air compressor 33 to the high-pressure charge air cooler 34 via a high-pressure charge air conduct 60 within the high-pressure stage. The charge air LL compressed and cooled in this manner is mixed with exhaust gas from an exhaust gas recirculation in a mixing section. The mixing section and an exhaust gas recirculation after an exhaust gas recirculation heat exchanger of the exhaust gas recirculation unit are designed in duplicate, i.e., for every row of cylinders of the V-type arrangement (A1 to A6 and B1 to B6). An inlet manifold conduct for an A-side and B-side of the V-type arrangement of cylinders A1 to A6 and B1 to B6 is connected to the mixing section in each case.

On the exhaust gas side, exhaust gas AG from an outlet manifold of the A-side (cylinders A1 to A6) or an outlet manifold of the B-side (cylinders B1 to B6) can either be supplied to the exhaust gas recirculation or an exhaust gas conduct by means of the exhaust gas turbines.

Parts of a charging group 100 including a low-pressure stage as well as a high-pressure stage and an exhaust gas recirculation unit are illustrated in FIG. 1 in addition to assemblies mounted on the motor unit 200 of the internal combustion engine 1000. The motor unit 200 of the internal combustion engine is depicted by the capped cylinder heads of the cylinders A1 to A6 (A-side) and the cylinders B1 to B6 (B-side), which are part of the motor unit 200 in a V-type arrangement. The charging group 100 is arranged on the top side of the motor unit 200 and designed in the explained fashion for a two-stage charging and exhaust gas recirculation in a triple charger arrangement. Here, a number of components of the charging group 100 are carried by a carrier housing 1 illustrated in FIG. 2 and FIG. 3. The components carried by the carrier housing 1 are shown in FIG. 1. The components comprise a first and second low-pressure charge air cooler 14, 24 mentioned above, also referred to as intercooler for charge air LL, a high-pressure charge air cooler 34 for charge air mentioned above and a high-pressure turbocharger 31. Moreover, the top view of the top side of the charging group 100 of FIG. 1 depicts the suction housing for charge air LL and an outlet for exhaust gas AG. Moreover, the first and second low-pressure turbocharger 11, 21 are shown as well as the exhaust gas recirculation heat exchanger 49 mentioned above. [FIG. 1 illustrates that the charging group 100 is formed on the top side of the motor unit 200 and the carrier housing 1 of FIGS. 2 and 3 is mounted in the interspace of the V-type arrangement of cylinders A1 to A6 and B1 to B6.]

Figure 2:
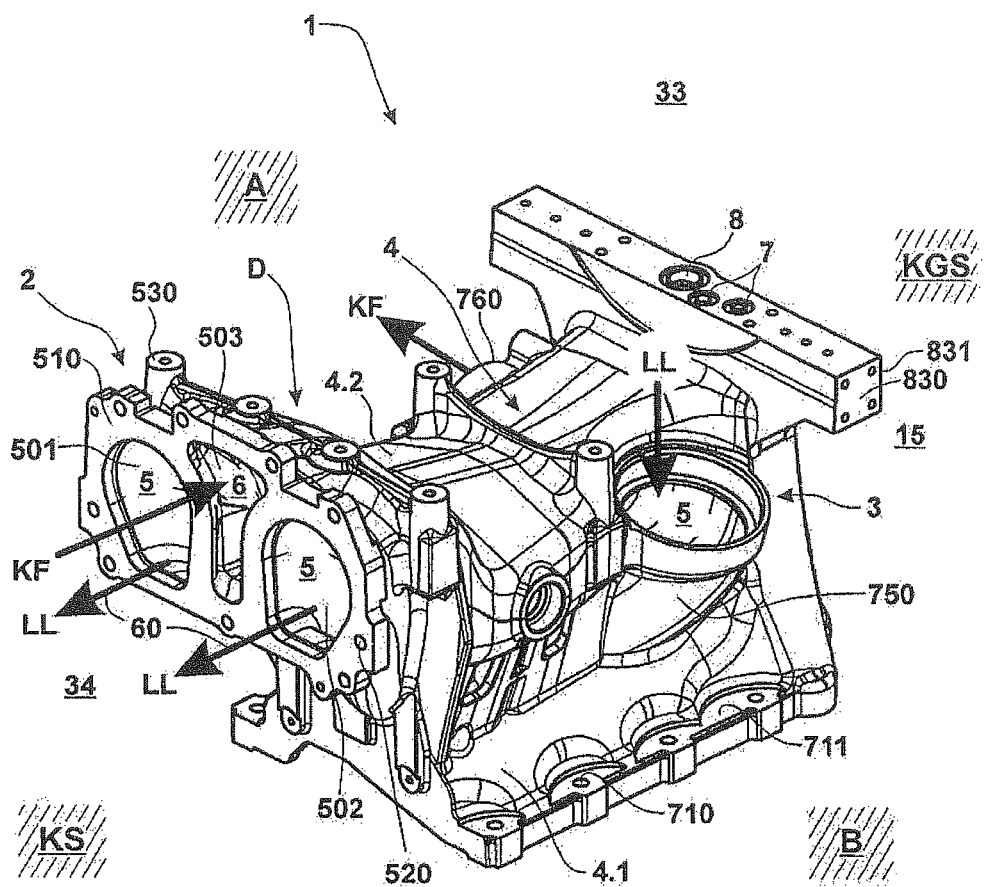
FIG. 2 shows a perspective representation of the front side of a carrier housing for the charging group of FIG. 1 from the direction of a power-driven side (KS) of the internal combustion engine.
Figure 3:
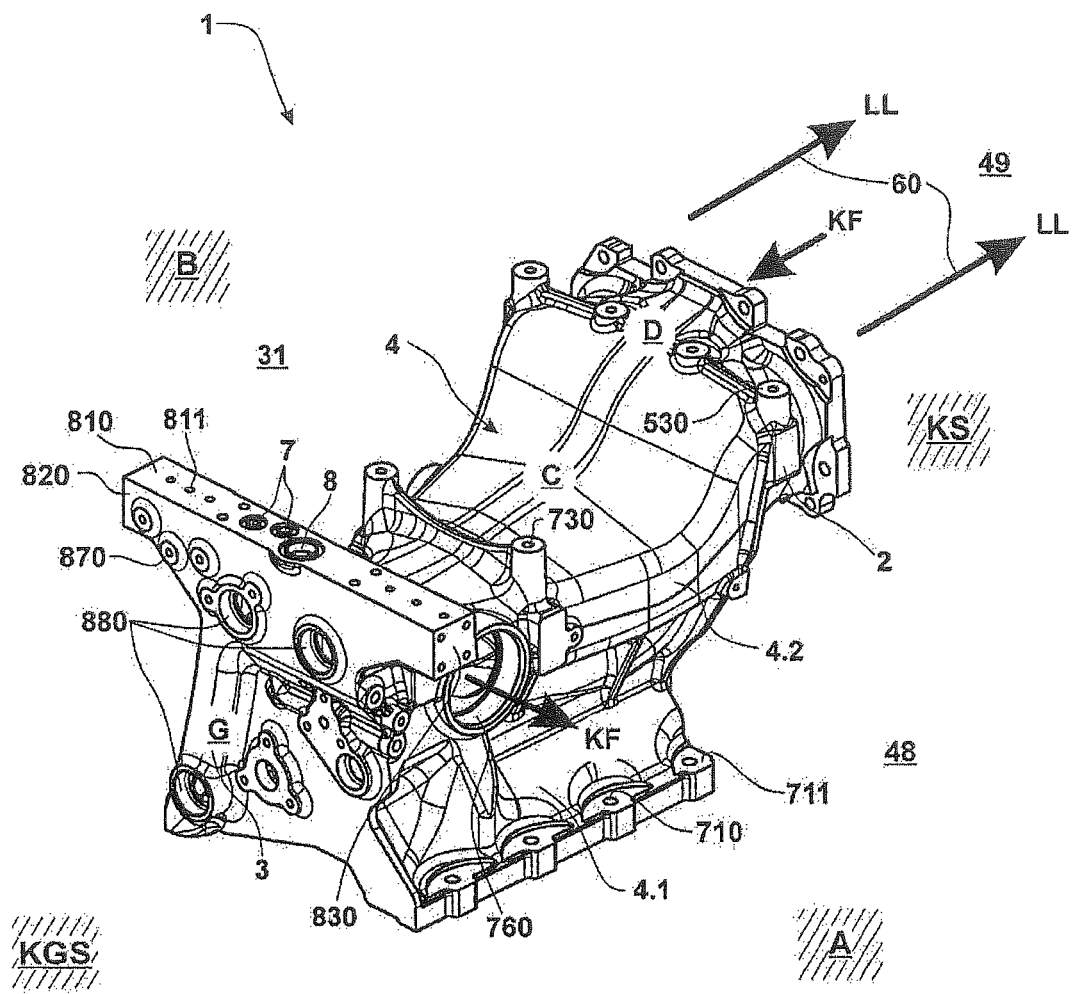
FIG. 3 shows a perspective representation of the back side of the carrier housing of FIG. 2 from the direction of the opposing power-driven side (KGS) of the internal combustion engine.

With respect to FIG. 2 and FIG. 3, in one exemplary arrangement, the carrier housing 1 is designed as a single and one-piece housing part. The housing part of the carrier housing 1 comprises a plurality of areas connected with each other as a single piece. They include the console part 2 on the front facing the power-driven side KS below as well as the console part 3 on the back facing the opposing power-driven side KGS and a cradle part 4 connecting said console parts 2, 3. The cradle part 4 itself has a one-piece base part 4.1 at the bottom, formed with the latter and a fluid conducting part 4.2 at the top side arranged above it. The latter resembles the shape of a saddle, in the narrowest part of which a bridge C extends from an A-side A to a B-side B, said bridge comprising a load-bearing support point to be specified in more detail on each of its ends for carrying the intercooler, i.e., the first and second low-pressure charge air cooler 14, 24. The basic function of the carrier housing 1 is explained based on FIG. 2 and the further constructive design based on FIG. 3.

In the mentioned embodiment, the carrier housing 1 is equipped with fastening means 710 on the underside, used to mount the carrier housing 1 at the top side of the motor unit 200 of the internal combustion engine 1000. Here, the fastening mechanism 710 is formed as screw holes on a receptacle flange 711 of the base part 4.1. A charge air channel 5 for conducting the charge air LL, here of the high-pressure stage, is provided on the inside of the fluid conducting part 4.2 of the carrier housing 1. The charge air channel 5 is used specifically for the formation of at least part of the high-pressure charge air conduct 60 in the high-pressure stage between the high-pressure compressor 33 of the high-pressure turbocharger 31 and the high-pressure charge air cooler 34 of the high-pressure stage, both of which are depicted symbolically in FIG. 2.

Furthermore, a coolant channel 6 for conducting a coolant KF of the exhaust gas recirculation unit is formed on the inside of the carrier housing 1, namely on the inside of the fluid conducting part 4.2. Specifically, a coolant channel 6 for conducting the coolant KF from the exhaust gas recirculation heat exchanger 49 to a coolant recirculation cooler 48 not illustrated in detail is provided on the inside of the fluid conducting part 4.2, which are sketched symbolically in FIG. 3. Finally, a channel 7 for coolants and a channel 8 for lubricants are formed on the inside of the carrier housing, namely here for the high-pressure turbocharger 31, which is depicted symbolically in FIG. 3.

With reference to FIG. 2, the console part 2 on the front comprises a first and a second charge air outlet 501, 502 to a high-pressure charge air cooler 34. Moreover, the console part 2 on the front comprises an inlet 503 for a coolant KF of an exhaust gas recirculation cooler 49. The two charge air outlets 501, 502 and the inlet 503 are formed on a flange 510 facing the front side of the console part 2 on the front. The flange 510 carries a fastening mechanism 520 for the high-pressure charge air cooler 34 at least in the area of the second charge air outlet 502, such that in the present case the high-pressure charge air cooler 34 can be screwed onto the flange 510 by means of the fastening mechanism 520.

The console part 2 comprises a bridge D on a side of the console part 2 on the front opposing the flange 510, i.e., on a side of the console part 2 facing the cradle part 4, said bridge extending from an A-side A to a B-side B of the carrier housing 1. Here, the bridge D carries four load-bearing support points for the formation of the carrying arrangement 530 for the low-pressure charge air coolers 14, 24 also known as intercoolers. The low-pressure charge air coolers 14, 24 are additionally supported on carrying arrangement 730 of the bridge C of the fluid conducting part 4.2. Here, the carrying arrangement 530 is formed with a quantity of four load-bearing support points on the console part 2 on the front and the carrying arrangement 730 in the form of two load-bearing support points at the top of the fluid conducting part 4.2, in each case at equal distances on a bridge D or C of the console part 2 on the front or the fluid conducting part 4.2. In each case, one load-bearing support point is created as a pocket hole with a lug, which is provided with an internal screw thread for retaining a screw. An intercooler, namely a first low-pressure charge air cooler 14 or a second low-pressure charge air cooler 24 can be screwed onto the carrying arrangements 530, 730 in this fashion and thus be mounted on the motor unit 200 supported at the top by the carrying arrangement 530, 730.

As illustrated in FIG. 3, the console part 3 on the back has an almost turned over L-shaped cross-section in the present case. One side S of the turned over L-shaped cross-section forms a connecting strip on the inside of which channels 7, 8 for coolants and lubricants of the high-pressure turbocharger 31, in particular the exhaust gas high-pressure turbine provided here, are formed. Moreover, the connecting strip of the side S equally serves as carrying arrangement for the high-pressure turbocharger 31. For this purpose, the side S comprises a supporting area 810 as well as a side area 820 on the back adjacent to an edge of the supporting area 810 as well as a side area 830 on the side. The side area 830 on the side has connecting holes 831 described in detail and illustrated in FIG. 2, which are used for screwing an air filter 15 onto the carrier housing 1. In addition, the supporting area 810 comprises a plurality of connecting holes 811 used for screwing the high-pressure turbocharger 31, in particular an exhaust gas high-pressure turbine onto the supporting area 810 by supporting it. In addition, both the supporting area 810 as well as the side area 820 on the back having a side S and fork G of the L-shaped cross-section of the console part 3 on the back are provided with connections 870 and 880 for the channels 7, 8 arranged on the inside mentioned above for coolants and lubricants of the high-pressure turbocharger 311.

All in all, it is apparent that the carrier housing 1 is formed with the console parts 2, 3 and the cradle part 4. Together, the console part 2 on the front and the cradle part 4 carry an intercooler in the form of the first low-pressure charge air cooler 14 and the second low-pressure charge air cooler 24. In addition, the high-pressure charge air cooler 34 can be mounted on the console part 2 on the front. The console part 3 on the back is used to carry the high-pressure turbocharger 31 as well as air filter 15 of the charging group 100.

Based on an embodiment of the invention, fluid conduct channels of at least these components of the charging group 100 are formed underneath the components, namely on the inside of the carrier housing 1, such that they can be accommodated in the interspace of the V-type arrangement of cylinders A1 to A6 or B1 to B6 by means of the carrier housing 1, i.e., between an A-side A and a B-side B of the internal combustion engine. Specifically, a charge air channel 5 for conducting the charge air LL and a coolant channel 6 for conducting the coolant KF of the exhaust gas recirculation cooler 49 are arranged underneath the intercoolers 14, 24 and the high-pressure charge air cooler 34 and the high-pressure turbocharger 31. This not only achieves a particularly compact and operationally reliable arrangement of said fluid channels 5, 6 on the inside of the carrier housing 1. Moreover, the mentioned fluid channels, namely the charge air channel 5 and the coolant channel 6, are arranged such that a synergistic effect for cooling the charge air LL with the coolant KF is achieved. Specifically, it is provided in the present case that the fluid conducting part 4.2 comprises fluid passages on the front which are not specified in more detail to the console part 2 on the front as well as fluid passages on the side to the high-pressure turbocharger 31 and coolant recirculation cooler 48.

A charge air inlet 750 on the side is arranged on a B-side B with the formation of a diffusor for conducting charge air LL from a high-pressure compressor 33. A fluid outlet 760 for conducting coolant KF to a coolant recirculation cooler 48 is arranged on an opposing A-side A of the fluid conducting part 4.2. An inlet 503 for coolant KF from an exhaust gas recirculation cooler 49 between the two charge air outlets 501 and the high-pressure charge air cooler 34 is arranged on the front side of the carrier housing 1, i.e. on the console part 2 in the front. Not only is said arrangement mounted in the connecting flange 510 with the best possible utilization of area, but it additionally achieves the closest possible spatial and heat-conducting contact between the charge air channel 5 and the coolant channel 6. For this purpose, the coolant connection 503 of the console part 2 on the front in the flange 510 on the front comprises an essentially Y-shaped cross-section. The charge air outlets 501, 502 for charge air LL are in turn designed as a diffusor, which again increases the heat-conducting contact with the coolant channel 6. The diffusor formations at the charge air outlets 501, 502 as well as on the charge air inlet 750 especially achieve a particularly favorable flow equalization and a reduction of the flow speed of the charge air LL. For instance, the heat exchange in the carrier housing 1 improves, which in turn achieves a better efficiency for charging the internal combustion engine 1000. With the conditions on the inside of the carrier housing 1 outlined above, i.e., arrangement, design and connection of the fluid conducting part 4.2 and charge air channel 5 for conducting the charge air LL and channel 6 for conducting the coolant KF, fluids (charge air LL and coolant KF) can flow through them in opposing flow directions. This is illustrated with the corresponding directions of the arrows of the charge air LL and the arrows representing the coolant KF in FIG. 2 and FIG. 3. As a result, comparatively hot charge air LL of the charge air conduct 60 from the high-pressure stage—namely directly from the high-pressure compressor 33—collides with comparably warm coolant KF in the fluid conducting part 4.2 of the carrier housing 1. On the console part 2 on the front, already comparatively cool charge air LL is guided in close proximity to a coolant KF directly from the exhaust gas recirculation cooler 49, where its temperature is still lower. Thus, the temperature differences between charge air LL on the one hand and coolant KF on the other hand in the carrier housing 1 are advantageously coordinated with the counterflow conduct of the charge air LL and the coolant KF.

In summary, the disclosure relates to a carrier housing 1 for an internal combustion engine 100 and a motor unit 200 having a V-type arrangement of cylinders A1-A6, B1-B6 and having a charging group 100, designed for a two-stage charging with a low-pressure stage and a high-pressure stage and an exhaust gas recirculation, wherein the carrier housing 1 is designed to carry at least a number of components of the charging group 100.

The conceptual design of the disclosures provides that the carrier housing 1 is designed to be arranged on the top side of the motor unit 200 of the internal combustion engine 1000 in the interspace of the V-type arrangement of cylinders, in particular as a single and in particular as a one-piece carrier housing 1. For this purpose, the carrier housing 1 comprises:
  fastening means 720 on the underside for fastening the carrier housing 1 on the top side of the motor unit 200,
  a charge air channel 5 for conducting the charge air LL of the high-pressure and/or low-pressure stage of the charging group 100 formed on the inside of the carrier housing 1 and
  a coolant channel 6 for conducting the coolant KF of the exhaust gas recirculation 100 of the charging group formed on the inside of the carrier housing 1,
  a channel 7 for coolants and channel 8 for lubricants for the high-pressure and/or low-pressure stage of the charging group 100 formed on the inside of the carrier housing 1 and
  carrying arrangements 530, 730 on the top side for components of at least the high-pressure and/or low-pressure stage of the charging group 100.

What is claimed is:
1. A carrier housing for an internal combustion engine having a motor unit with a V-type arrangement of cylinders and having a charging group designed for a two-stage charging with a low-pressure stage and a high-pressure stage and an exhaust gas recirculation, wherein the carrier housing is designed to carry at least a number of components of the charging group, wherein:
  the carrier housing is designed to be arranged on a top side of the motor unit in an interspace of the V-type arrangement, wherein the carrier housing further comprises:
  a fastening mechanism on an underside of the carrier housing for mounting the carrier housing on the top side of the motor unit,
  a charge air channel formed on an inside of the carrier housing for conducting charge air of the high-pressure and/or the low-pressure stage of the charging group
  a coolant channel formed on the inside of the carrier housing for conducting coolant of the exhaust gas recirculation of the charging group, and
  a channel formed on the inside of the carrier housing for coolants and a channel for lubricants for the high-pressure and/or the low-pressure stage of the charging group and
  at least one carrying element at the top side for components of at least the high-pressure and/or low-pressure stage of the charging group.

2. A carrier housing according to claim 1, wherein
the charge air channel formed on the inside of the carrier housing is for conducting the charge air of a high-pressure turbocharger of the high-pressure stage to at least one connection with a high-pressure charge air cooler and
wherein the coolant channel formed on the inside of the carrier housing is for conducting the coolant of an exhaust gas recirculation cooler to a coolant outlet and to a coolant recirculation cooler,
wherein the channel formed on the inside of the carrier housing for coolants and channel for lubricants for the high-pressure turbocharger of the high-pressure stage and
wherein the carrying element is configured for at least one intercooler for charge air and
a second fastening mechanism for the high-pressure charge air cooler for charge air and
a carrying element for the high-pressure turbocharger.

3. A carrier housing according to claim 1 wherein the carrier housing further comprises:
  a cradle part arranged between a first console part on a front and a second console part on a back, said cradle part joining the first and second console parts and having a base part at a bottom and a fluid conducting part at the top side,
wherein the base part comprises the fastening mechanism for fastening the carrier housing on the top side of the motor unit of the internal combustion engine,
wherein the console part on the front comprises
  at least one charge air outlet to a high-pressure charge air cooler,
  an inlet for a coolant of an exhaust gas recirculation cooler
  a carrying element for at least one intercooler for charge air and
  a second fastening mechanism for the high-pressure charge air cooler for charge air,
wherein the fluid conducting part comprises:
  a charge air inlet from one high-pressure turbocharger of the high-pressure stage and a charge air channel formed on an inside of the fluid conducting part for conducting the charge air of the high-pressure turbocharger of the high-pressure stage to at least one charge air outlet to the high-pressure charge air cooler and
  a coolant outlet to a coolant recirculation cooler and a coolant channel formed on the inside of the fluid conducting part for conducting the coolant KF of the exhaust gas recirculation cooler to the coolant outlet, wherein the second console part comprises coolant and lubricant connections as well as channels formed on an inside of the second console part for coolants and lubricants for the high-pressure turbocharger and a supporting area for the high-pressure turbocharger.

4. A carrier housing according to claim 3, wherein the fluid conducting part and the first console part comprise carrying elements at the top for carrying the intercooler, in that the carrying elements are formed as a number of load-bearing support points, where a load-bearing support point is formed as a pocket hole with a lug, where-in the first console part has more load-bearing support points than the fluid conducting part.

5. A carrier housing according to claim 3, wherein the fluid conducting part comprises fluid passages on the front to the first console part and fluid passages on the side to the high-pressure turbocharger and coolant recirculation cooler.

6. A carrier housing according to claim 5, wherein a fluid passage forms a diffusor as an integral part of the carrier housing.

7. A carrier housing according to claim 5 wherein the fluid passages on the side to the high-pressure turbocharger and coolant recirculation cooler are arranged opposite each other on opposing sides of the fluid conducting part.

8. A carrier housing according to claim 3, wherein the inlet for a coolant of an exhaust gas recirculation cooler on the front of the first console part is arranged between two charge air outlets and a high-pressure charge air cooler.

9. A carrier housing according to claim 3, wherein the first console part comprises an extensive flange on the front having an inlet for coolant and at least one charge air outlet.

10. A carrier housing according to claim 3, wherein an inlet for coolant of the first console part has a Y-shaped cross-section.

11. A carrier housing according to claim 3, wherein the second console part has one of an almost turned over L-shaped cross-section and T-shaped cross-section, wherein one side of the L-shaped cross-section or T-shaped cross-section forms a supporting area on the top for the high-pressure turbocharger.

12. A carrier housing according to claim 11, wherein a side area on the back is joined with an edge of the supporting area, wherein the side area and the supporting area are interspersed with connections for coolant and lubricant channels.

13. A carrier housing according to claim 11, wherein one side of the L-shaped cross-section or T-shaped cross-section comprises a connecting strip for motor assemblies, in particular an air filter.

14. A carrier housing according to claim 1, wherein the charge air channel formed on the inside of the carrier housing for conducting the charge air and the channel formed on the inside of the carrier housing for conducting the coolant are designed and connected such that fluid can flow through them in opposing flow directions.

15. An internal combustion engine having a motor unit with a V-type arrangement of cylinders and a charging group on a top side of the motor unit designed for a two-stage charging and an exhaust gas recirculation, comprising:
 a low-pressure stage having a first and second low-pressure turbocharger and
 a high-pressure stage having a high-pressure turbocharger, wherein
 each of the turbochargers comprises an exhaust gas turbine and a charge air compressor which can be driven with said exhaust gas turbine,
 an exhaust gas recirculation as well as a one-piece carrier housing according to claim 1, wherein the carrier housing is arranged on the top side of the motor unit and the motor unit carries at least a number of components of the charging group, wherein the components comprise:
 an intercooler for charge air, a high-pressure charge air cooler for charge air and a high-pressure turbocharger and wherein
 the carrier housing is mounted in the interspace of the V-type arrangement using a fastening mechanism.

* * * * *